United States Patent
Park et al.

[11] Patent Number: 5,942,070
[45] Date of Patent: *Aug. 24, 1999

[54] METHOD FOR INSULATING A COMPOSITE PRESSURE VESSEL HAVING IMPROVED ADHESIVENESS BETWEEN THE INSULATION AND THE VESSEL

[75] Inventors: Byeong-Yeol Park; Sang-Ki Chung; Bal Jung, all of Daejon, Rep. of Korea

[73] Assignee: Agency For Defense Development, Daejon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/705,603

[22] Filed: Aug. 30, 1996

[30] Foreign Application Priority Data

Aug. 31, 1995 [KR] Rep. of Korea .................. 95-28068

[51] Int. Cl.⁶ .................. B32B 31/12; B28B 7/34
[52] U.S. Cl. .................. 156/173; 156/155; 156/175; 264/135; 264/137; 264/220; 264/227; 264/257; 264/258; 264/313; 264/317; 264/250; 264/221; 264/256
[58] Field of Search .................. 264/135, 220, 264/227, 257, 137, 258, 313, 317, 250, 221, 256; 156/73.2, 155, 173, 175

[56] References Cited

U.S. PATENT DOCUMENTS

| | | | |
|---|---|---|---|
| 1,232,110 | 1/1917 | Sloper . | |
| 2,151,307 | 3/1939 | Smith | 264/258 |
| 2,943,009 | 6/1960 | Mirsky et al. | 264/258 |
| 3,101,065 | 8/1963 | Kalis | 113/49 |
| 3,210,228 | 10/1965 | Bluck | 156/172 |
| 3,249,672 | 5/1966 | Richards et al. | 264/219 |
| 3,303,079 | 2/1967 | Carter | 156/172 |
| 3,414,449 | 12/1968 | Beach | 156/173 |
| 3,449,182 | 6/1969 | Wiltshire | 156/69 |
| 3,607,600 | 9/1971 | Schreter et al. | 264/257 |
| 3,627,601 | 12/1971 | Hayes et al. | 156/73.2 |
| 3,784,451 | 1/1974 | Garner | 204/20 |
| 4,193,829 | 3/1980 | Kourtides et al. | 156/276 |
| 4,263,243 | 4/1981 | Wilson et al. | 264/137 |
| 4,285,901 | 8/1981 | Yotsutsuji et al. | 264/220 |
| 4,364,887 | 12/1982 | Becht etal. | 264/258 |
| 4,596,619 | 6/1986 | Marks | 156/171 |
| 4,655,866 | 4/1987 | Ferrier | 156/192 |
| 4,684,423 | 8/1987 | Brooks | 156/156 |
| 4,756,248 | 7/1988 | Sato | 102/287 |
| 4,776,760 | 10/1988 | Grisz | 415/197 |
| 4,792,423 | 12/1988 | Craig et al. | 264/3.1 |
| 4,834,929 | 5/1989 | Dehoff et al. | 264/220 |
| 4,921,557 | 5/1990 | Nakamura | 156/169 |
| 4,925,611 | 5/1990 | Shockney et al. | 264/135 |
| 4,959,110 | 9/1990 | Russell | 156/187 |
| 5,004,513 | 4/1991 | Bemis et al. | 156/191 |
| 5,007,343 | 4/1991 | Marks | 102/290 |
| 5,219,461 | 6/1993 | Hyll et al. | 415/197 |
| 5,344,515 | 9/1994 | Chenock, Jr. | 156/171 |

FOREIGN PATENT DOCUMENTS

| | | | |
|---|---|---|---|
| 57-98320 | 6/1982 | Japan | 264/516 |
| 2117862 | 10/1983 | United Kingdom | 264/516 |

*Primary Examiner*—Jan H. Silbaugh
*Assistant Examiner*—Robin S. Gray
*Attorney, Agent, or Firm*—Scully, Scott, Murphy & Presser

[57] ABSTRACT

A method for fabricating a composite pressure vessel comprising layering up of an uncured carbon fiber fabric/resin prepreg on a mold. Thereupon an uncured insulating rubber is layered up and combined with the uncured carbon fiber fabric/resin prepreg by autoclaving. This method produces an insulator for a composite pressure vessel which insulator is an aspect of the present invention.

6 Claims, 2 Drawing Sheets

METHOD FOR INSULATING A COMPOSITE PRESSURE VESSEL HAVING IMPROVED ADHESIVENESS BETWEEN THE INSULATION AND THE VESSEL

BACKGROUND OF THE INVENTION

1. Field of the Invention

The present invention relates to an insulation and a fabrication method thereof for a composite pressure vessel having an improved adhesiveness and particularly to an insulation and a fabrication method thereof for a composite pressure vessel which is capable of tolerating relatively high pressure and protecting the pressure vessel from high temperature by providing better adhesiveness between the insulation and the pressure vessel.

2. Description of the Conventional Art

The filament winding method of fabricating a typical pressure vessel is classified into a wet winding method and a dry winding method in accordance with materials used therein.

Of which, the wet winding method is directed to inserting an epoxy resin into a fiber while a carbon fiber in a roving form passes through an epoxy resin tube and to forming a carbon fiber in which an epoxy resin is formed on the surface of the insulation rubber (EPDM: Ethylene Propylene Diene Monomer) provided at an outer portion of a sand mold.

The dry winding method is directed to directly forming a prepreg roving in which an epoxy resin is formed in a carbon fiber in a roving form on an outer portion of a sand mold.

According to the above-mentioned dry winding method, since the viscosity of an epoxy resin used therein is high, the epoxy resin does not accumulate at one side during the curing process therefore rotating a mandrel is unnecessary, and an autoclave (vacuum and formation pressure: 10 kg/cm$^2$) can be used to cure the epoxy resin. Therefore, it is possible to achieve better adhesiveness between the insulation and the pressure vessel when the same adhesive employed in the wet winding method is used. However, the dry winding method has disadvantages in that the materials used therein are expensive.

Meanwhile, the wet winding method has the advantage that the materials used therein are not expensive compared with the dry winding method. However, in order to prevent the epoxy resin from being accumulated on one side it must be rotated in the oven because the epoxy resin has a relatively low viscosity. Since insulation rubber, which is widely used as an insulation material, has non-polar characteristics, the insulation rubber does not possess better adhesiveness with respect to the adhesive used therein. So as to overcome these disadvantages, a primary process with respect to the surface of the insulation rubber was introduced; however, the problems were not improved substantially. Another method was introduced so as to improve the problems. That is, so as to improve adhesiveness between the pressure vessel and the insulation, an epoxy resin is forcibly penetrated to the surface of the insulation during a pressure vessel fabrication. In addition, so as to increase the surface between the epoxy resins constituting the insulation and the pressure vessel, the following method was introduced in the industry. That is, there are certain pressures in the insulation, of which one is a pressing force which occurs when forming a carbon fiber on the rubber surface of the mandrel, and of which another one is applied between the outer surface of the insulation and a composite pressure vessel because an internal mandrel and the insulation have a certain thermal expansion coefficient higher than that of the carbon fiber at the room temperature of 25° C. after a wet winding process is completed.

Meanwhile, carbon fiber, which is weak with respect to external impact, can be broken due to pressure accumulated in the insulation. Therefore, reducing the force applied to the carbon fiber is necessary, compared with when a glass fiber receives an external force. In addition, the pressure between certain elements, which occurs due to the different thermal expansion coefficients in the wet winding process, is smaller than that of the pressure applied in the autoclave process of the dry winding method, and there is a limit in applying a vacuum to the boundary portion between certain elements to remove air gaps. Therefore, the wet winding method using carbon fiber has relatively low adhesiveness compared with the dry winding method.

In addition, stress between the pressure vessel and the insulation exists due to the different thermal expansion coefficients which occur due to a temperature decrease from a curing temperature of 150° C. to room temperature of 25° C. Generally, as the temperature (minimum level of −40° C.) is decreased, and the rubber grows thicker, the residual stress grows greater. Therefore, the non-contact surface at the boundary portions between corresponding elements disadvantageously increases.

In addition, the price of the materials is about twice the price in case that a prepreg roving state exists in the epoxy resin containing a carbon fiber compared that a carbon fiber is contained in the epoxy resin during a winding process. That is, the materials used on the dry winding method is expensive compared with the wet winding method.

SUMMARY OF THE INVENTION

Accordingly, it is an object of the present invention to provide an insulation and a fabrication method thereof for a composite pressure vessel having improved adhesiveness, which overcome the problems encountered in a conventional insulation and a fabrication method thereof for a composite pressure vessel.

It is another object of the present invention to provide an insulation and a fabrication method thereof for a composite pressure vessel having an improved adhesiveness capable of tolerating high pressure and protecting the pressure vessel from high temperature by providing better adhesiveness between the insulation and the pressure vessel.

It is further another object of the present invention to provide insulation for a composite pressure vessel having an inner surface provided with an insulation rubber and an outer surface contacting with the inner surface thereof and provided with a solid epoxy containing a carbon fiber.

To achieve the above objects, a method is provided for fabricating a composite pressure vessel having an improved adhesiveness, which includes the steps of layering up an uncured carbon fiber fabric/resin prepreg on a mold; and then layering up uncured insulation rubber and combining said prepreg and said insulation rubber by autoclaving whereby adhesiveness between the fabric/resin prepreg and the insulation rubber is improved.

DETAILED DESCRIPTION OF THE INVENTION

Figure 1:
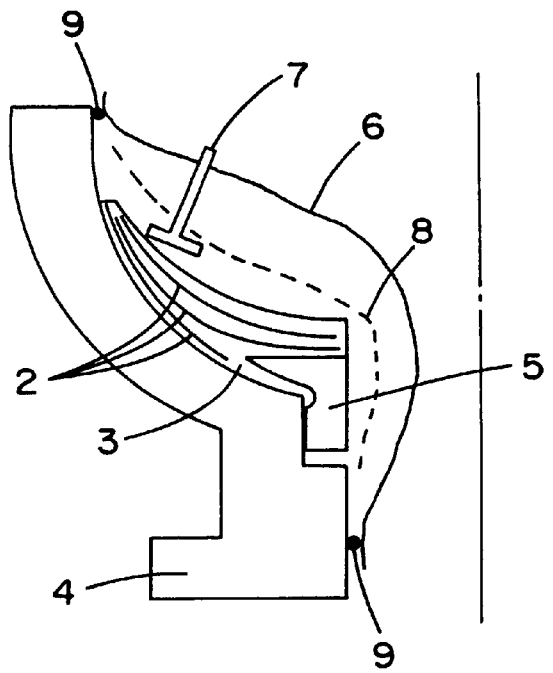
FIG. 1 is a cross-sectional view of a composite pressure vessel so as to show a process of forming an insulation rubber and a carbon fiber fabric/resin epoxy prepreg by autoclaving according to the method of the present invention.

An insulation and a fabrication method for a composite pressure vessel having an improved adhesiveness will now be explained.

To begin with, the fabrication method includes a first step which forms an uncured carbon fiber fabric/resin prepreg 2 so as to form an outer surface of an insulator on a first mold 4; a second step which forms uncured insulation rubber 3 on the uncured carbon fiber fabric/resin prepreg 2 having a thickness equal to the thickness of the insulating rubber; and a third step in which the carbon fiber fabric/resin prepreg 2 and the uncured insulating rubber 3 forms a cured integral unit by autoclaving.

The carbon fiber fabric/resin prepreg 2 is a carbon fiber inter-woven fabric and an uncured epoxy resin.

In addition, the object of the present invention is to provide an insulator 1 in which an inner surface is made of the insulating rubber and an outer surface is made of the carbon fiber/resin prepreg 2.

Meanwhile, the epoxy resin and the insulating rubber 3 of the carbon fiber fabric/resin prepreg 2 formed in the autoclaving step has good flexibility during autoclaving because it is uncured, so that it is possible to extend the contacting surface to have better adhesiveness, thus achieving a better adhesiveness between the insulating rubber 3 and the carbon fiber fabric/resin prepreg 2.

The thusly fabricated insulator 1 with the insulating rubber 3 and the prepreg 2 has an inner surface of the insulating rubber 3 and an outer surface, contacting with the inner surface of the pressure vessel 20, of a carbon fiber containing an epoxy, in which the carbon fiber fabric/resin prepreg 2 is cured therein.

When the pressure vessel 20 is fabricated by a wet filament winding using the thusly fabricated insulator 1, the solid epoxy containing a carbon fiber constituting the outer surface of the insulator is formed by an uncured epoxy resin 19 containing a carbon resin. Therefore, since the outer surface of the insulator 1 and the uncured resin 19 containing a carbon resin constituting the pressure vessel 20 have the same chemical structure and a similar solubility coefficient so that there is good chemical attraction between the outer surface of the insulator 1 and the inner surface of the pressure vessel 20, thus achieving good adhesiveness between the insulator 1 and the pressure vessel 20.

In addition, since the contact surface between the inner surface of the pressure vessel 20 and the outer surface of the insulator 1 increases because the adhesiveness with respect to the outer surface of the insulator 1 consisting of a solid epoxy containing a carbon fiber is good, and because the uncured epoxy resin can be easily penetrated into the curved portion of the solid epoxy surface of the outer surface of the insulator 1 in the wet winding process, the adhesiveness between the insulator 1 and the pressure vessel 20 is better because a chemical reaction between the non-reacted epoxy composition and the epoxy resin containing the carbon fiber occurs.

Therefore, the present invention results in the fabrication of an insulator 1 at lower cost compared with the dry winding method. In particular, as in the wet winding method, it is impossible to apply much force between the insulator 1 and the pressure vessel 20, whereas it is possible to achieve the desired adhesiveness between the insulator 1 and the pressure vessel 20 in the present invention.

In more detail, the insulation fabrication method for a composite pressure vessel will now be explained.

A metal boss 5 is disposed on a first mold 4. An uncured insulating rubber 3 fabricated by a calendaring process after forming a single ply of an uncured carbon fiber fabric/resin prepreg 2 on the first mold 4, on which a heterogeneous material is formed, is formed to have a desired thickness. At this time, an adhesive (Chemlok primer 7701/adhesive 238) is formed on the insulating rubber 3 which is in contact with the prepreg 2. Air gaps between the insulating rubber 3 and the uncured carbon fiber fabric/resin prepreg 2 are removed, and the insulating rubber 3 and the uncured carbon fiber fabric/resin prepreg 2 is cured by autoclaving. At this time, the inner portion of the vacuum film 6 has a vacuum pressure over 700 mmHg, and the outer portion has a pressure over 10 kg/cm$^2$, and the temperature thereof is maintained at 150° C. for four hours, so that there is complete cohesiveness between the epoxy and the cured fabric prepreg 2.

In the drawings, reference numeral 5 is a metal boss, 8 is an opening, and 9 is a sealant.

The pressure vessel fabrication method using the thusly fabricated insulator 1 will now be explained.

Figure 2A:
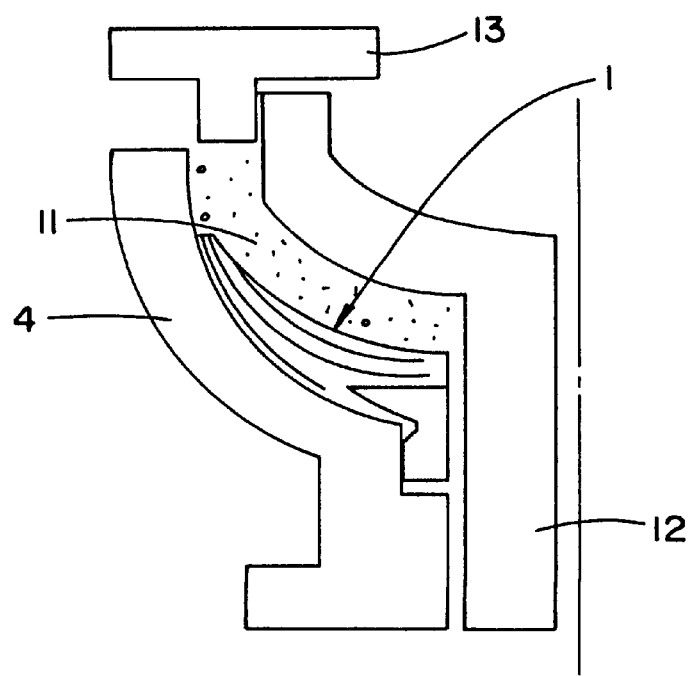
FIG. 2A is a cross-sectional view of a composite pressure vessel so as to show a process of forming a sand mold in an insulator using an improved insulation fabrication method according to the present invention.

As shown in FIG. 2A, after inserting a sand mold 11 consisting of sand and water glass particles where the sand mold 11 is used as the mandrel of the wet winding process between the second mold 12 and the insulator 1, the sand mold 11 is fabricated by pressing a third mold 13 in a pressing machine and by drying it in an oven.

Figure 2B:
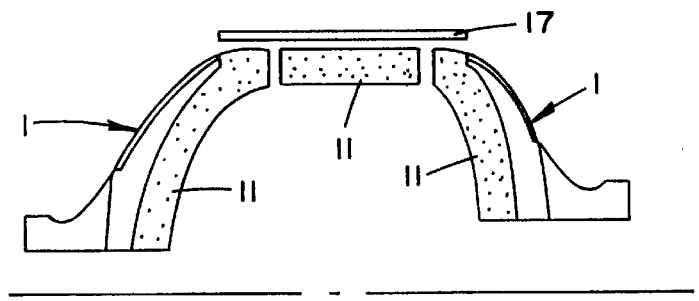
FIG. 2B is a cross-sectional view of a composite pressure vessel so as to show a process of assembling the sand molds in the insulator of FIG. 2A according to the present invention.

The thusly fabricated sand mold 11 is assembled as shown in FIG. 2B to form a shape similar to that of the pressure vessel 20. In addition, a TEFLON tape 17 is wound on the linear portion of the sand mold 11 so as to protect the uncured epoxy resin 19 from penetrating into the sand mold 11.

Figure 2C:
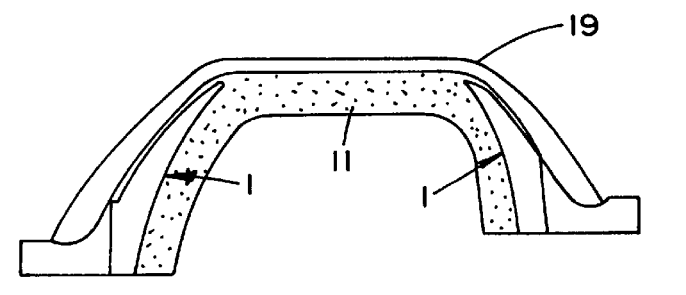
FIG. 2C is a cross-sectional view of a composite pressure vessel so as to show completion of pressure vessel fabrication using the wet winding method with respect to the sand mold of FIG. 2B according to the present invention.

In addition, as shown in FIG. 2C, the uncured epoxy resin 19 containing the carbon fiber is formed on the sand mold 11 using the wet winding process.

Figure 2D:
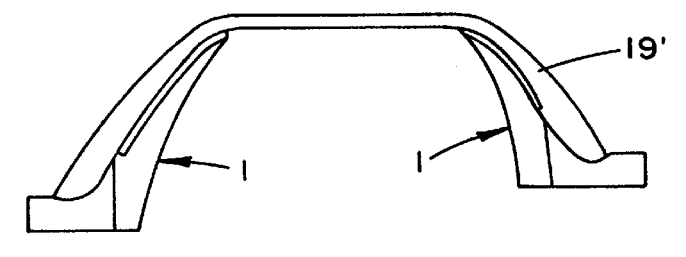
FIG. 2D is a cross-sectional view of a composite pressure vessel so as to show that a sand mold is removed after the pressure vessel is cured in an oven in according to the present invention.
Figure 2E:
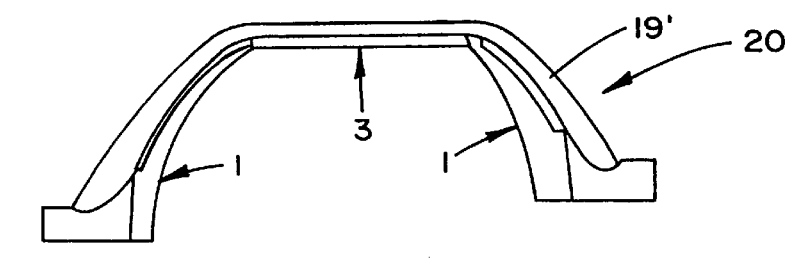
FIG. 2E is a cross-sectional view of a composite pressure vessel fabricated after forming an insulation rubber on an inner linear portion of the pressure vessel according to the present invention.

When the carbon fiber is thusly formed, as shown in FIG. 2D, water is filled into the pressure vessel 20 after curing the epoxy resin in an oven, and the pressure vessel 20 is placed for a predetermined time so as to remove the sand mold 11 by dissolving the water glass particles contained therein. In the drawings, reference numeral 19' denotes a solid material which is the cured epoxy containing a carbon fiber after curing.

Thereafter, the pressure vessel 20 is fabricated by forming the uncured insulating rubber 3 on the inner linear portion of the solid epoxy constituting the shape of the pressure vessel 20 and by autoclaving.

As described above, the insulation and the fabrication method for the composite pressure vessel having improved adhesiveness is capable of achieving a better chemical attraction between the insulator 1 and the pressure vessel 20 by providing the same materials therebetween, so that better adhesiveness can be achieved in the wet winding method. In addition, the product can be fabricated at lower cost compared with the dry winding method.

What is claimed is:

1. A method of fabricating a composite pressure vessel comprising the steps of:
    (a) layering up an uncured carbon fiber fabric/resin prepreg on a first mold;
    (b) layering up an uncured insulating rubber thereon;
    (c) curing said prepreg and said uncured insulating rubber to form an insulator, wherein said insulator forms an arch section of a pressure vessel;
    (d) forming a sand mold having a shape similar to that of said pressure vessel, including a linear section, against said insulator using said first mold and a second mold;
    (e) layering an uncured fiber reinforced resin on outer portions of said insulator and said sand mold;
    (f) curing said uncured fiber reinforced resin to form said pressure vessel;
    (g) introducing water into said pressure vessel to remove said sand mold;
    (h) layering uncured insulating rubber on an inner linear portion of said pressure vessel; and
    (i) autoclaving said pressure vessel to fabricate said composite pressure vessel.

2. A method in accordance with claim 1 wherein step (c) is effected in an autoclave.

3. A method in accordance with claim 1 wherein said sand mold formed in step (d) is fabricated by pressing sand and glass particles using a third mold in a pressing machine and thereafter drying said sand mold in an oven.

4. A method in accordance with claim 1 wherein step (f) is effected in an oven.

5. A method in accordance with claim 1 wherein said uncured fiber reinforced resin of step (e) is layered by wet filament winding.

6. A method in accordance with claim 1 wherein said uncured carbon fiber fabric/resin prepreg comprises uncured epoxy resin and is a fabric in which carbon fiber is interwoven.

* * * * *